US007457986B2

(12) United States Patent  
Larson et al.

(10) Patent No.: US 7,457,986 B2
(45) Date of Patent: Nov. 25, 2008

(54) APPARATUS AND METHOD FOR USING VARIABLE END STATE DELAY TO OPTIMIZE JTAG TRANSACTIONS

(75) Inventors: Lee A. Larson, Katy, TX (US); Henry R. Hoar, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 519 days.

(21) Appl. No.: 10/943,191

(22) Filed: Sep. 16, 2004

(65) Prior Publication Data

US 2005/0102575 A1 May 12, 2005

Related U.S. Application Data

(60) Provisional application No. 60/517,537, filed on Nov. 5, 2003.

(51) Int. Cl.
*G06F 11/00* (2006.01)
(52) U.S. Cl. ...................................................... 714/30
(58) Field of Classification Search .................... 714/30
See application file for complete search history.

(56) References Cited

U.S. PATENT DOCUMENTS

| 5,479,652 | A | * | 12/1995 | Dreyer et al. | 714/30 |
|---|---|---|---|---|---|
| 5,828,824 | A | * | 10/1998 | Swoboda | 714/25 |
| 6,055,649 | A | * | 4/2000 | Deao et al. | 714/30 |
| 6,546,505 | B1 | * | 4/2003 | Swoboda et al. | 714/30 |
| 6,889,344 | B2 | * | 5/2005 | Williams | 714/43 |
| 7,017,081 | B2 | * | 3/2006 | Gomez | 714/30 |
| 7,100,086 | B1 | * | 8/2006 | Kudo et al. | 714/30 |
| 7,231,551 | B1 | * | 6/2007 | Treue et al. | 714/30 |

* cited by examiner

*Primary Examiner*—Robert Beausoliel
*Assistant Examiner*—Amine Riad
(74) *Attorney, Agent, or Firm*—Wade J. Brady, III; Frederick J. Telecky, Jr.

(57) ABSTRACT

In a JTAG test and debug environment, the parameters that are accessed by command include a delay parameter. The delay parameter prevents the subsequent command from being executed until both the original command has been executed and the clock cycles indicated by the delay parameter have been completed. Because the time delay is included as a parameter identified by the command, the delay parameter can be programmed.

15 Claims, 4 Drawing Sheets

APPARATUS AND METHOD FOR USING VARIABLE END STATE DELAY TO OPTIMIZE JTAG TRANSACTIONS

This application claims priority under 35 USC §119(e)(1) of Provisional Application No. 60/517,537 (TI-36182P) filed Nov. 05, 2003.

FIELD OF THE INVENTION

This invention relates generally to the use of emulation units to perform test and debugging operations on a digital signal processor target system and, more particularly, to providing a method for optimizing JTAG (Joint Test Action Group) transactions between an emulation unit and the digital signal processor.

BACKGROUND OF THE INVENTION

Referring to FIG. 1, a block diagram of a test and debug system capable of advantageously using the present invention is shown. The test and debug system includes a user interface 5, a test and debug unit 10, and a target processor 15. The user interface 5 includes the apparatus that permits a user to interact with, and control the testing of, the target processing unit 15. The user interface 5 can include display apparatus, input apparatus such as a keyboard, etc. for initiating test and debug procedures and for receiving the results of these procedures. The user interface 5 is coupled to the test and debug unit 10 through interface unit 101. The interface unit 101 exchanges signals with the processing unit 102 of the test and debug unit 10. The processing unit 102 applies signals to and receives signals from the scan control unit 103. The scan control unit 103 includes a local processor 1031, and memory unit out 1032 for exchanging signals with the local processor 1031, a memory unit in 1035 for storing signals from the target processing unit 15, a shift register out 1034 and a shift register in 1033, the shift registers 1033 and 1034 transferring data in and out of the test and debug unit 10 under control of the local processor 1031. For purposes of the present invention, the processing unit 102 provides commands to the scan control unit 103 and supplies the contents of the memory unit 1032. The target processing unit 15 includes a test access port 151, a shift register 152, an instruction register 153, a data register 154, a mini-status register 155, and a data register 156. The test access port 151 is a state machine responsive to test mode select (TMS) signals from the processing unit 102 for controlling the JTAG apparatus in the target processing unit 15. The shift register 152 receives signals from the shift register out 1034 and transfers signals to the shift register in 1033. The shift register 152 applies signals to the instruction register 153 and with the data register 154 and receives signals from the mini-status register 155 and the data register 156.

Referring to FIG. 2, a portion of the contents of the memory unit out 1032, according to the prior art, is illustrated. In particular, the memory unit out 1032 includes a command parameter section 1032A. Examples of the parameters included in the command parameter section are parameters defining a JTAG scan length and parameters defining JTAG end states. A command from the processing unit 102 will include reference to these parameters and these parameters will be accessed and appropriate control signals applied to the test access port 151 by the local processor.

Referring to FIG. 3, the execution of a command is illustrated. When command A is issued, the command active signal is activated. The command active signal allows the go to shift state function, the send/receive function, and the go to end state to be executed by the scan control unit 103. When the command active signal is no longer active, then a next command B can be executed. If a command C is issued while the target processor is still executing command A, command C will fail and be must retried.

In the past, configurations employing a JTAG emulation unit to test and debug a digital signal processor have had to issue a transaction, such as a read memory command, and then issue additional commands to retrieve the data or to determine if the original transaction was successful. The delay between the commands was usually sufficient to allow the target system the opportunity to complete the transaction. Transactions are usually initiated when the JTAG state (machine) transitions through "Update IR" to "Idle" or Pause. (The state diagram for the JTAG test and debug procedure is shown in FIG. 4. The four stable, non-shift JTAG states are indicated in this Figure as states 41, 42, 43 and 44.) New transactions are initiated by entering the "Scan" state. When the target system does not respond in a timely manner, the transaction will fail, and the test and debug unit 10 must retry the transaction. The transaction retries impact the performance of the test and debug configuration and, in the situation involving large data transfers with many retries, can result in a significant degradation of the configuration performance.

In a high performance scan control unit which allows commands to be executed back to back or automatically repeated for block operations, the amount of time the target system has to respond to a request for data is typically about 4 or 5 test clocks. In a high performance scan controller running at 40 MHz, this provides only 100 to 125 ns for the transaction to succeed. If the target processor is busy 15 or the response can not be provided in the allowed amount of time, the command will fail and must be retried.

A need has been felt for apparatus and an associated method having the feature of being able to prevent a command failure as the result of insufficient time to execute a command. It would be yet another feature of the apparatus and associated method for provide a sufficient delay in a command to permit execution of the command prior to the execution of a next command. It would be a still further feature to provide a delay prior to the execution of a next command that is function of the command being executed. It would be yet another further feature of the apparatus and associated method to permit the delay before the execution of the next instruction to be programmed. It would be a more particular object of the present invention that a delay before the execution of a next instruction be accessed as a parameter of the command.

SUMMARY OF THE INVENTION

The aforementioned features are accomplished, according to the present invention, by providing a delay between a presently executing command and a next command. The delay is determined a parameter accessed in the memory out unit during the execution of a command by the scan control unit. The parameter is entered into an "end state delay" counter. When the scan control unit reaches the end state for a command, typically the JTAG IDLE state, but it can be any of the four stable, non shift JTAG states, the "end state delay" counter will result in a pause in the operation of the scan control unit for the specified number of test clock signals entered in the counter. Because the delay is a parameter entered in the memory unit out, the delay can be a function of the instruction and can be programmable.

Other features and advantages of present invention will be more clearly understood upon reading of the following description and the accompanying drawings and the claims.

DESCRIPTION OF THE PREFERRED EMBODIMENT

Detailed Description of the Figures

FIGS. 1, 2, 3, and 4 have been described with respect to the related art.

Figure 5:
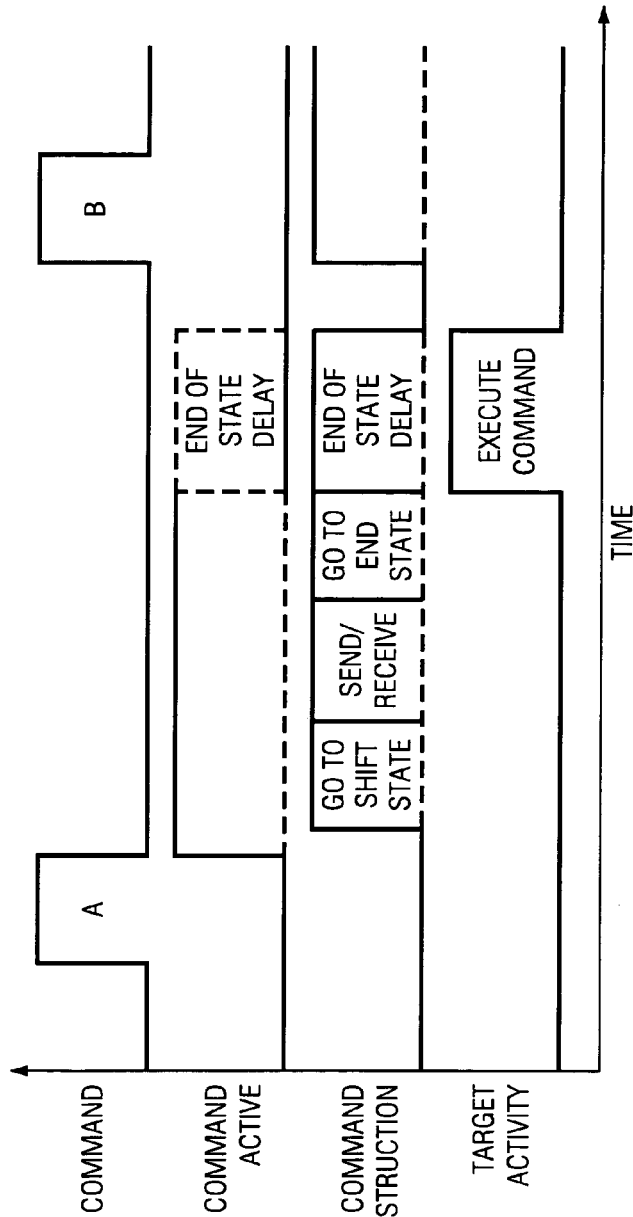
FIG. 5 illustrates the execution of a JTAG command in the test and debug environment according to the present invention.

Referring next to FIG. 5, execution of a command, according to the present invention, is illustrated. Command A is applied to the scan controller. The command active signal is activated. The instructions of the command A, i.e., the go to shift state instruction, the send/receive instruction, and the go to end state instruction, are executed. The "end state delay" signal is implemented at the end of the command, preventing the scan control unit from accepting new commands. At the end of the "end state delay" signal, the scan control unit is free to accept command B.

Figure 6:
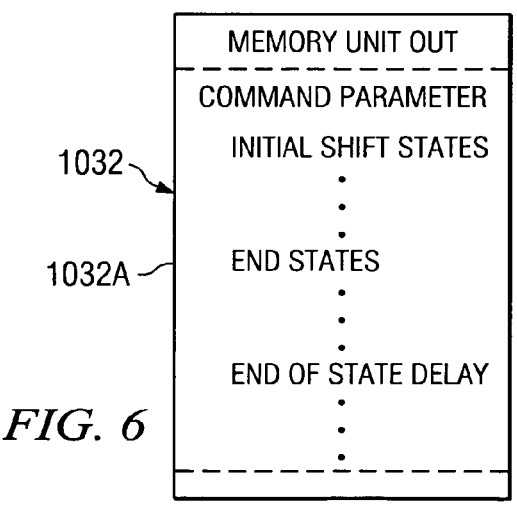
FIG. 6 illustrates the contents of the memory unit according to the present invention.

Referring to FIG. 6, the contents of the memory unit 1032 according to the present invention is shown. In particular, the command parameters include an "end state delay" parameter for preventing the execution of the next command until the present command has been executed. As will be clear to those skilled in that art, more than one "end state delay" parameter can be stored in the memory unit 1032. The correct parameter will be accessed as a result of the appropriate field in the command.

Figure 1:
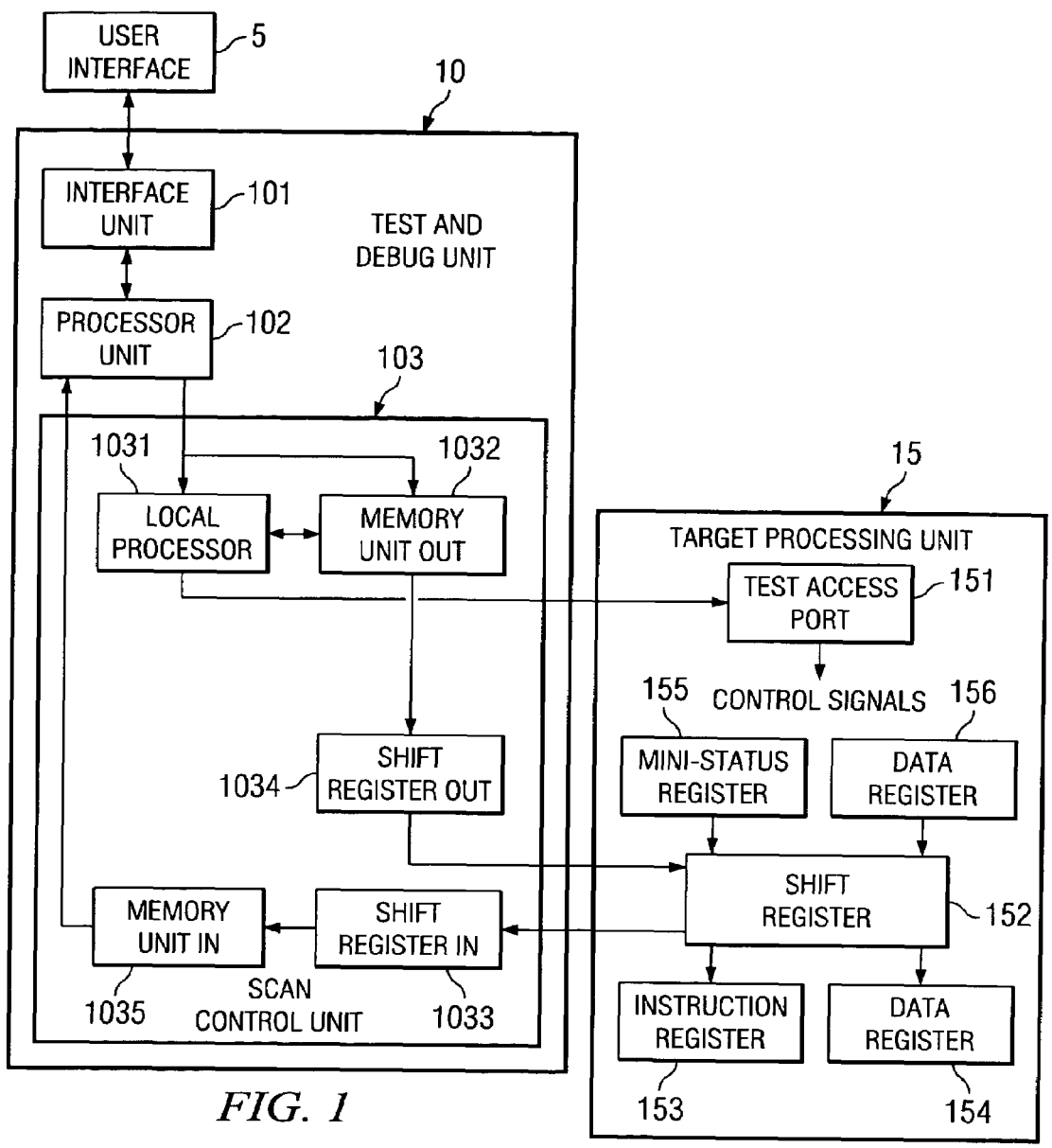
FIG. 1 is a block diagram of prior art test and debug apparatus capable of advantageously using the present invention.
Figure 2:
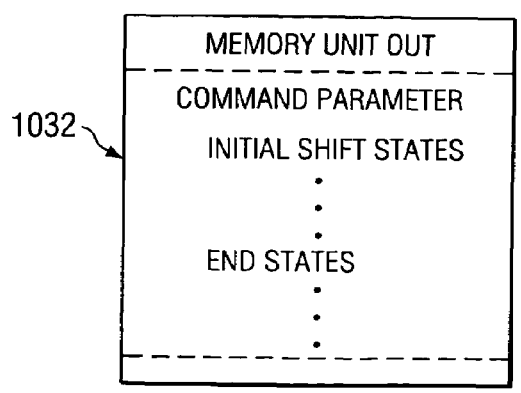
FIG. 2 illustrates the contents of the scan controller memory unit according to the prior art.
Figure 3:
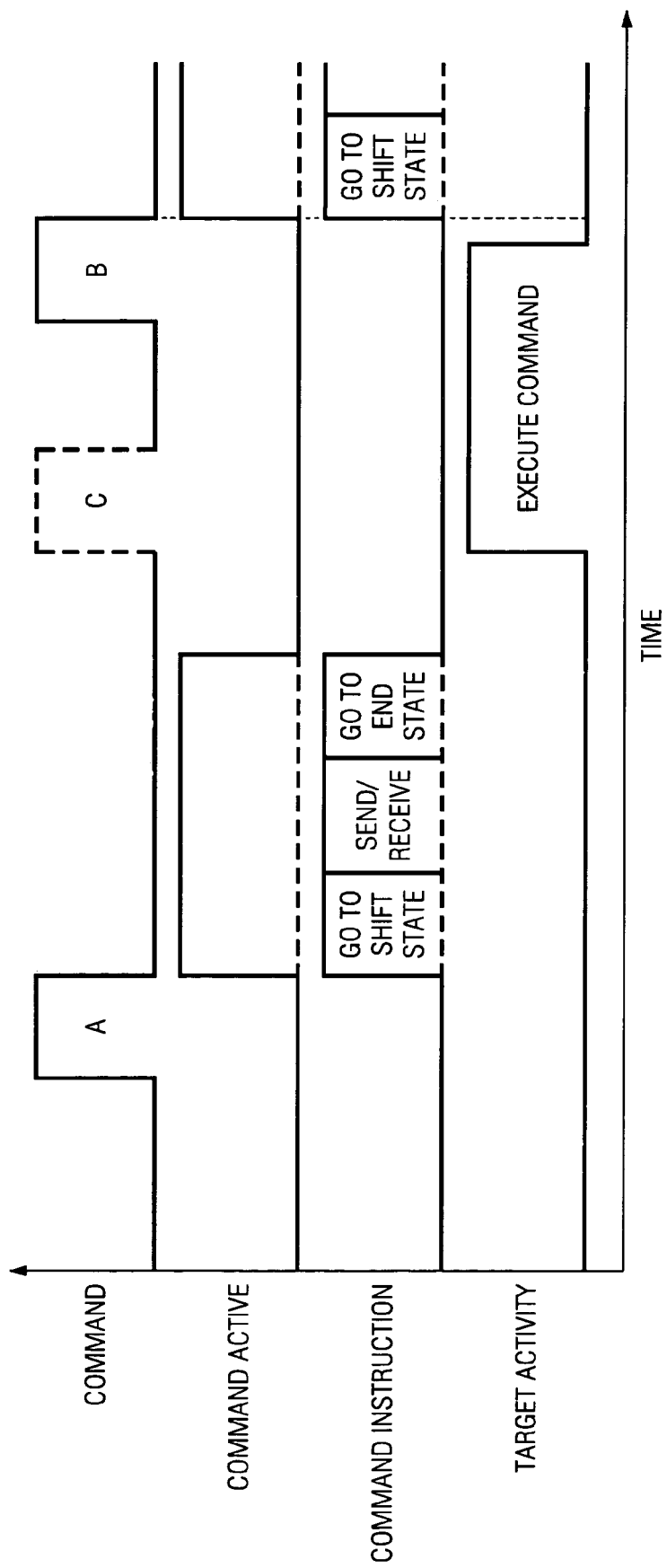
FIG. 3 illustrates the execution of a command in the JTAG test and debug environment according to the prior art.
Figure 4:
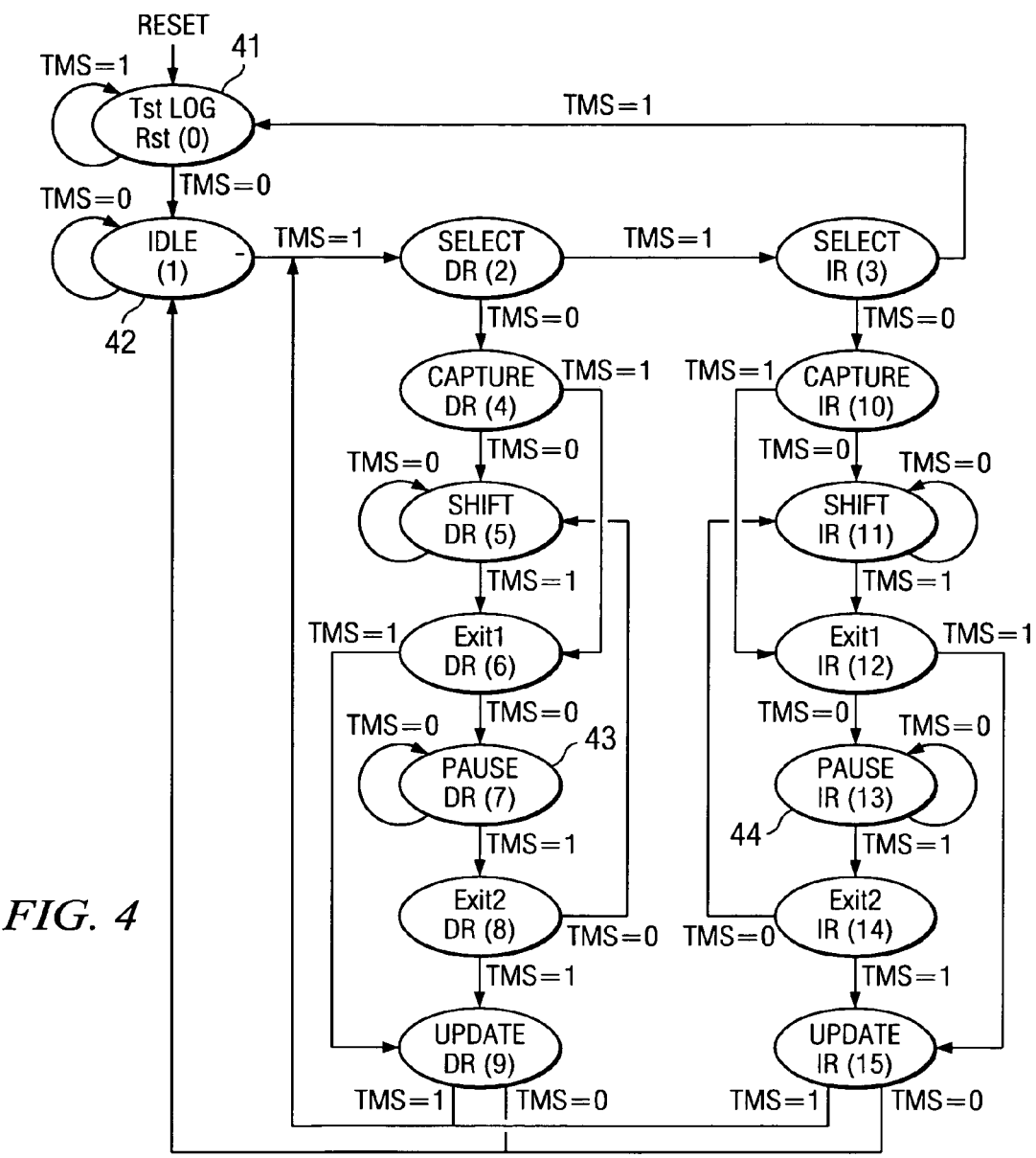
FIG. 4 is a JTAG state diagram according to the prior art.
Figure 7:
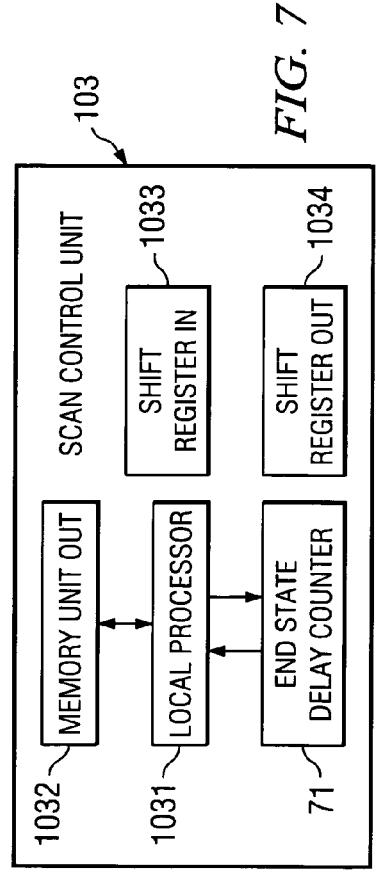
FIG. 7 is a block diagram of the test and debug configuration according to the present invention.

Referring to FIG. 7, the scan controller of FIG. 1 has been shown with the additional apparatus for providing the end state delay. The apparatus includes an "end state delay". When a shift instruction is entered in the local processor 1031, the "end state delay" parameter is entered in counter 71. This counter 71 is activated when the command reaches the programmed end state. Further command execution is delayed until the contents of the counter 71 reach the parameter value. At that point, command execution can resume again.

Figure 8:
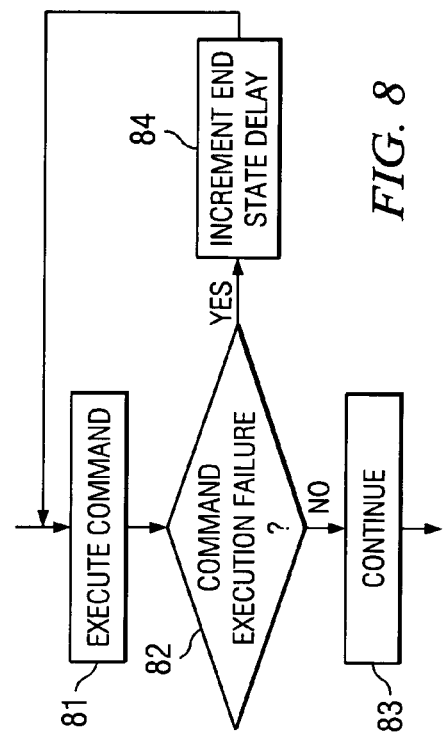
FIG. 8 illustrates how the time delay can be programmed to accommodate a changing test environment according to the present invention.

Referring to FIG. 8, the procedure for programming the "end state delay" is illustrated. In step 81, an attempt is made to execute a command. The failure of the execution of the command is identified in step 82. When the execution of the command does not fail, the process continues in step 83. When the execution does fail in step 82, the "end state delay" count is increased and the process is returned to step 81. In this manner, the "end state delay" parameter can be adjusted by software to accommodate the conditions experienced by the test and debug configuration.

Operation of the Preferred Embodiment

The present invention permits the JTAG command execution to accommodate the particular features of the individual instructions, but also to accommodate the conditions of the apparatus. The individual instructions can be accommodated by providing an "end state delay" that takes into account the activity of the instruction. In addition, the conditions found in the test and debug environment can also be accommodated and can be adjusted by software.

The high performance scan controller provides four different programmable end state values. The scan control unit has the capability of issuing two sequential commands simultaneously and also has the ability to repeat single commands or groups of sequential commands. Each of the two sequential commands has a separate end state delay and two other end state delay values used when the commands are repeated.

The end state delay values are stored in a memory unit that is addressed according to the particular end state delay required. These values can also be stored in discrete registers. When the scan control unit reaches the end state specified by the command word, the selected value is loaded into a counter and decremented until the counter reaches zero. The scan controller then resumes executing the second command or repeating the current command, depending upon the command code sequence loaded by the software.

The software can monitor the success rate of sequential and/or repeated commands and automatically adjust the end state delay values to minimize the number of retries, while maximizing the performance. Similarly, the end state delay value can be decremented when performing the same the command until failure occurs. In this manner, a minimum end state delay value can be ascertained, thereby maximizing the efficiency of the signal group transfer.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A test and debug system for testing a target processor, the system comprising:
    data transfer apparatus in the target processor to receiving data and for transferring data;
    a test access port in the target processor responsive to control signals, the control signals determining the state of the test and debug apparatus in the target processor; and
    a scan control unit, the scan control unit including:
        a processor responsive to commands for generating the control signals;
        at least one register responsive to signals from the processor for exchanging data with the data transfer apparatus; and
        a time delay unit, the time delay signal for preventing execution of a next sequential instruction for a selected period of time, wherein the selected period of time is increased when the next sequential instruction is not executed within the selected period of time.

2. The system as recited in claim 1 further including a memory unit, wherein the selected period of time is stored in the memory unit.

3. The system as recited in claim 2 wherein, in response to the first command, the selected period of time is transferred from the memory unit to the time delay unit.

4. The system as recited in claim 3 wherein the time delay unit is a counter and the selected period of time is determined by a number of clock cycles.

5. The system as recited in claim 4 wherein the number of clock cycles is programmable.

6. The system as recited in claim 5 wherein the end state delay is programmed for maximum command execution efficiency.

7. The system as recited in claim 1 further comprising a processing unit, the processing unit transferring commands to the processor for execution.

8. In a test and debug system, a method for preventing the execution of a second command from failing because of conflict with first command, the method comprising:
   providing a delay signal overlapping at least a final portion of the execution of the first command;
   preventing execution of the second command during the delay signal, and
   automatically extending the length of the delay signal when a conflict between the first and the second command is identified.

9. The method as recited in claim 8 further comprising determining the length of the delay signal by a field in the first command.

10. The method as recited in claim 9 further comprising a field in the first command identifies one of a plurality of delay signals, wherein each delay signal has a different time delay length.

11. For use in a test and debug system implementing JTAG procedures for testing a target processor, a scan control unit comprising:
   a processor responsive to commands;
   a register unit for exchanging signal groups with a target processor in response to a command;
   a memory unit exchanging signal groups with the processor, the memory unit storing parameters specifying the execution of a command; and
   a delay unit, the processor transferring a delay parameter to the delay unit, the delay unit preventing execution of a next sequential command for a length of time determined by the delay parameter;
   wherein when the command is not executed with in the length of time, the length of time is automatically increased.

12. The scan control unit as recited in claim 11 wherein a command can identify one of a plurality of delay parameters.

13. The scan control unit as recited in claim 12 wherein the delay unit is a counter, and the delay parameter is the number of clock cycles to be counted.

14. The scan control unit as recited in claim 11 wherein as a result of a next sequential command failure, the delay parameter of the command automatically is increased.

15. The scan control unit as recited in claim 14 wherein the delay parameter is programmed to provide maximum performance in the execution of commands.

\* \* \* \* \*